(12) United States Patent
Miki

(10) Patent No.: US 10,811,677 B2
(45) Date of Patent: Oct. 20, 2020

(54) ACTIVE MATERIAL AND FLUORIDE ION BATTERY

(71) Applicant: TOYOTA JIDOSHA KABUSHIKI KAISHA, Toyota-shi, Aichi-ken (JP)

(72) Inventor: Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 15/821,992

(22) Filed: Nov. 24, 2017

(65) Prior Publication Data

US 2018/0183048 A1  Jun. 28, 2018

(30) Foreign Application Priority Data

Dec. 22, 2016  (JP) ................... 2016-249064

(51) Int. Cl.
| | |
|---|---|
| H01M 4/36 | (2006.01) |
| H01M 10/36 | (2010.01) |
| H01M 4/50 | (2010.01) |
| H01M 4/52 | (2010.01) |
| H01M 4/58 | (2010.01) |

(Continued)

(52) U.S. Cl.
CPC ............. *H01M 4/36* (2013.01); *H01M 4/131* (2013.01); *H01M 4/1315* (2013.01); *H01M 4/502* (2013.01); *H01M 4/523* (2013.01); *H01M 4/582* (2013.01); *H01M 10/36* (2013.01); *H01M 4/483* (2013.01); *H01M 10/05* (2013.01); *H01M 10/0562* (2013.01); *H01M 2004/026* (2013.01); *H01M 2300/008* (2013.01)

(58) Field of Classification Search
None
See application file for complete search history.

(56) References Cited

U.S. PATENT DOCUMENTS 4,110,251 A * 8/1978 Lauder ................. B01D 53/34
502/225
5,601,949 A * 2/1997 Fujimoto ............. H01M 4/483
429/221

(Continued)

FOREIGN PATENT DOCUMENTS

JP  2015-191797 A  11/2015
WO  2015/146265 A1  10/2015

OTHER PUBLICATIONS

Hibino et al., Oxygen rocking aqueous batteries utilizing reversible topotactic oxygen insertion/extraction in iron-based perovskite oxides Ca1—xLaxFeO32d, Scientific Reports, 2 : 601, DOI: 10.1038/srep00601 (Year: 2012).*

(Continued)

*Primary Examiner* — Ula C Ruddock
*Assistant Examiner* — Anna Korovina
(74) *Attorney, Agent, or Firm* — Oliff PLC

(57) ABSTRACT

An active material has a favorable capacity property. The active material is to be used for a fluoride ion battery, the active material including a crystal phase having a perovskite structure, and represented by $ABO_3$ or a fluoride of the $ABO_3$, in which the A and the B are different metal elements; the A includes at least one kind of a metal element belonging to Group 2 and Group 3 in the periodic table; and the B includes at least one kind of a transition metal element belonging to Period 4 to Period 6 in the periodic table.

18 Claims, 8 Drawing Sheets

(51) Int. Cl.
*H01M 4/1315* (2010.01)
*H01M 4/131* (2010.01)
*H01M 4/02* (2006.01)
*H01M 10/0562* (2010.01)
*H01M 10/05* (2010.01)
*H01M 4/48* (2010.01)

(56) References Cited

U.S. PATENT DOCUMENTS

2013/0130103 A1* 5/2013 Kim .............. H01M 4/364
 429/211
2016/0190550 A1* 6/2016 Choi .............. H01M 4/525
 252/182.1

OTHER PUBLICATIONS

Sturza (Fluorination of Iron Hexagonal Perovskites Promoting Low Temperature Oxygen Mobility, Chem. Mater. 2010, 22, 6726-6735, DOI:10.1021/cm102724k (Year: 2010).*

Clemens et al., "Electrochemical fluorination of perovskite type BaFeO2.5", Dalton Trans., 2014, 43, 15771, DOI: 10.1039/c4dt02485k, with supplemental material. (Year: 2014).*

Cava, Perovskite Structure and Derivatives, https://www.princeton.edu/~cavalab/tutorials/public/structures/perovskites.html (Year: 2009).*

Kida et al. ("Oxygen Permeation Properties of Partially A-Site Substituted BaFeO3-δ Perovskites", Journal of the Electrochemical Society, 156 (12) E187-E191 (2009), DOI: 10.1149/1.3231690 (Year: 2009).*

Clemens et al. "Electrochemical fluorination of perovskite type BaFeO2.5". Dalton Trans., 43, pp. 155771-155778, 2014.

M.E. Arroyo-de Dompablo et al., In quest of cathode materials for CA ion batteries: the CaMO3 perovskites (M = Mo, Cr, Mn, Fe, Co, and Ni); Phys.Chem.Chem.Phys.; 2016; pp. 19966-19972; vol. 2.

* cited by examiner

ACTIVE MATERIAL AND FLUORIDE ION BATTERY

TECHNICAL FIELD

The present disclosure relates to an active material having a favorable capacity property.

BACKGROUND ART

As high-voltage and high-energy density batteries, for example, Li ion batteries are known. The Li ion battery is a cation-based battery utilizing a Li ion as a carrier. Meanwhile, as anion-based batteries, fluoride ion batteries utilizing a fluoride ion as a carrier are known.

For example, Patent Literature 1 discloses a liquid electrolyte for a fluoride ion battery; the liquid electrolyte using an aromatic material having an aromatic cation and an anion, as a solvent. Also, a metal active material such as Cu is exemplified as an active material. The object of this technique is to provide a liquid electrolyte for a fluoride ion battery capable of increasing capacity of a battery.

CITATION LIST

Patent Literature

Patent Literature 1: Japanese Patent Application Laid-Open (JP-A) No. 2015-191797

SUMMARY OF DISCLOSURE

Technical Problem

In light of improving the performance of a fluoride ion battery, an active material having a favorable capacity property is required. The present disclosure has been made in view of the circumstances, and a main object thereof is to provide an active material having a favorable capacity property.

Solution to Problem

In order to achieve the object, the present disclosure provides an active material to be used for a fluoride ion battery, the active material comprising: a crystal phase having a perovskite structure, and represented by $ABO_3$ or a fluoride of the $ABO_3$, in which the A and the B are different metal elements; the A includes at least one kind of a metal element belonging to Group 2 and Group 3 in the periodic table; and the B includes at least one kind of a transition metal element belonging to Period 4 to Period 6 in the periodic table.

According to the present disclosure, an active material having a favorable capacity property may be obtained by comprising a crystal phase having the perovskite structure and the specific composition.

In the disclosure, the A preferably includes at least one of Mg, Ca, Sr, Ba, Sc, Y, La, Ce, Nd, and Sm.

In the disclosure, the B preferably includes at least one of Ti, V, Cr, Mn, Fe, Co, Ni, Zr, Nb, Mo, Ru, and W.

Among the above, the B preferably includes Co. The active material may have high-potential and high-output, and the energy density of a fluoride ion battery using the active material of the disclosure may be increased.

Also, the present disclosure provides a fluoride ion battery comprising a cathode active material layer containing a cathode active material, an anode active material layer containing an anode active material, and an electrolyte layer formed between the cathode active material layer and the anode active material layer, wherein the cathode active material or the anode active material is the above described active material.

According to the present disclosure, usage of the above described active material as the cathode active material or the anode active material allows a fluoride ion battery with a favorable cycle property.

Advantageous Effects of Disclosure

The present disclosure exhibits an effect that is capable of providing an active material having a favorable capacity property.

DESCRIPTION OF EMBODIMENTS

Figure 1:
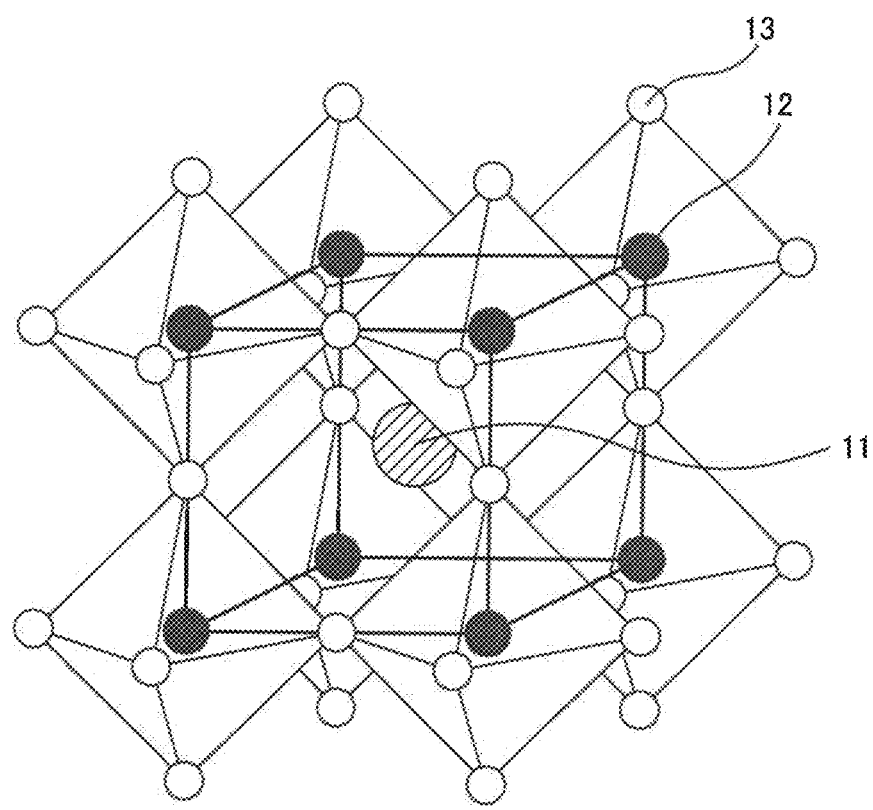
FIG. 1 is an illustrative drawing explaining an example of a perovskite structure in the active material of the present disclosure.

The active material and the fluoride ion battery of the present disclosure will be hereinafter described in detail.

A. Active Material

The active material of the present disclosure is an active material to be used for a fluoride ion battery, the active material comprising a crystal phase having a perovskite structure, and represented by $ABO_3$ or a fluoride of the $ABO_3$, in which the A and the B are different metal elements; the A includes at least one kind of a metal element belonging to Group 2 and Group 3 in the periodic table; and the B includes at least one kind of a transition metal element belonging to Period 4 to Period 6 in the periodic table.

According to the present disclosure, an active material having a favorable capacity property may be obtained by comprising a crystal phase having the perovskite structure and the specific composition. Also, the active material of the present disclosure is a novel active material that may be used for a fluoride ion battery.

Here, it is presumed that the charge and discharge of the active material of the present disclosure proceed due to a reaction different from that of conventional metal active materials. Many of the conventionally known active materials for a fluoride ion battery are metal active materials, whose function as the active material appears due to, for example, the fluorination and defluorination reactions of a metal such as Cu.

$MeF_x + xe^- \leftrightarrow Me + xF^-$ (Me comprises one kind or more of metal elements)

However, the fluorination and defluorination reactions involve a great change in the crystal structure, which may easily increase resistance. Also, the cycle property may be easily lowered since the expansion and contraction at the time of the change in crystal structure are large.

On the contrary, the present inventor has acquired knowledge from prior researches that an active material comprising a crystal phase having a layered perovskite structure and the specific composition exhibits a function as an active material. It is presumed that the function is due to the intercalation and desorption reactions (intercalation reaction) in which a fluoride ion is intercalated and desorbed, in between the layers of the layered perovskite structure. Such intercalation type active material is based on a novel idea different from that of a conventional fluorination and defluorination type active material for a fluoride ion battery. The intercalation reaction is a reaction that does not involve large change in the crystal structure; an advantage thereof is that the resistance is not easily increased. Also, there is an advantage that the cycle property is high since the expansion and contraction at the time of the change in crystal structure are small.

The further, utmost researches have led the present inventor to acquire knowledge that there is a possibility of occurrence of the intercalation reaction in non-layered structure. In other words, the non-layered active material of the present disclosure (active material comprising a crystal phase having the perovskite structure and the specific composition) may possibly function as an active material since the intercalation reaction of the fluoride ion occurs to proceed charge and discharge, thus, presumably have a favorable capacity property. In that case, the skeleton of the crystal structure is thought to be maintained also during charge and discharge. Thus, it is expected that the resistance is not easily increased, and is expected to have a higher cycle property and a higher rate property than the conventional metal active materials used for a fluoride ion battery.

Although the mechanism of the case the intercalation reaction of the fluoride ion occurs in the crystal phase having the perovskite structure is not clearly known, it is presumed to be caused by the formation of a vacancy in the crystal structure of the crystal phase. For example, when the active material of the present disclosure is used as a cathode active material, the substitution reaction between a part of the O elements and the F element, due to the redox of the O element, is believed to occur upon the charge reaction. Then, during subsequent discharge reaction, it is presumed that, upon desorption of the F element from the crystal structure, a site that is not occupied by the O element (vacancy) is formed, and in the subsequent charge and discharge reactions, the intercalation reaction occurs utilizing the vacancy.

The crystal phase having perovskite structure in the present disclosure may be represented by $ABO_3$ or a fluoride of the $ABO_3$. When the crystal phase in the present disclosure is represented by $ABO_3$, the active material of the present disclosure is in the state before the initial charge or in the completely discharged state.

For example, as shown in FIG. 1, the crystal phase having perovskite structure represented by $ABO_3$ has the crystal structure in which: A ion 11 is positioned at the center of a cube including eight B ions 12; further, each B ion 12 is positioned at the center of a regular octahedron including eight oxygen ions 13; and the regular octahedrons are arranged three-dimensionally in rows along x, y and z axes, sharing the vertexes. FIG. 1 shows an example of the crystal phase structure when the perovskite structure is a cubic system.

Usually, a metal ion having large ion radius becomes the A ion, and a metal ion having small ion radius becomes the B ion. In the present disclosure, the position of the A ion is referred to as an A site, and the position of the B ion is referred to as a B site. Incidentally, the above described structure may be identified by, for example, an X-ray diffraction measurement (XRD measurement).

The crystal phase in the present disclosure usually has the unit cell of a cubic, however, not limited thereto. Even in the structure whose diffraction main phase is, for example, a tetragon, a rhombohedron, an orthorhombus, a pseudo cubic, or a monocline, in other words, even when the structure is distorted as compared to the perovskite structure of the cubic, the charge and discharge are presumed to be proceeded similarly so as to have a favorable capacity property, as long as the crystal phase having the specific composition is included.

The A corresponds to the A site in the perovskite structure, and includes at least one kind of a metal element belonging to Group 2 and Group 3 in the periodic table.

The A may be just the metal element belonging to Group 2, may be just the metal element belonging to Group 3, and may be the metal element belonging to Group 2 and the metal element belonging to Group 3. Also, the metal element belonging to Group 2 may be one kind, and may be two kinds or more. Similarly, the metal element belonging to Group 3 may be one kind, and may be two kinds or more.

The metal element belonging to Group 2 is an alkaline earth metal, and examples thereof may include Mg, Ca, Sr, and Ba. Meanwhile, the metal element belonging to Group 3 is a rare earth element, and examples thereof may include Sc, Y, La, Ce, Nd, and Sm. The A is preferably at least one of Mg, Ca, Sr, Ba, Sc, Y, La, Ce, Nd, and Sm. Among the above, the A preferably includes at least one of Ca, Sr, La, Y, and Ce.

As shown in the later described Examples, the active material including Ca, Sr, or La at the A site may have a high charge and discharge capacity. Also, the listed metal elements belonging to Group 2 and Group 3 that are not the above described three kinds of the metal elements are generally known as to correspond to the A site in the perovskite structure, and have similar property as that of the above described three kinds of the metal elements since they belong to the same group as the above described three kinds of the metal elements. Therefore, the active material of the present disclosure is presumed to exhibit a high charge and discharge capacity by also including the listed metal elements belonging to Group 2 and Group 3 that are not the above described three kinds of the metal elements, at the A site in the perovskite structure.

The B corresponds to the B site in the perovskite structure, and is a metal element different from the A. The B includes at least one kind of a transition metal element belonging to Period 4 to Period 6 in the periodic table.

The B may be just the transition metal element belonging to any one Period of Period 4 to Period 6, and may be two or more of the transition metal elements belonging to any two Periods of Period 4 to Period 6. Further, the B may be three or more of the transition metal elements belonging to each Period of Period 4 to Period 6.

Also, the transition metal element belonging to Period 4 may be one kind, and may be two kinds or more. Similarly, the transition metal element belonging to each Period of Period 5 and Period 6 may be one kind, and may be two kinds or more.

Examples of the transition metal elements belonging to Period 4 to Period 6 in the periodic table may include elements belonging to Group 4 to Group 12. Examples of the transition metal elements belonging to Period 4 may include Ti, V, Cr, Mn, Fe, Co, and Ni. Examples of the transition metal elements belonging to Period 5 may include Zr, Nb, Mo, and Ru. Examples of the transition metal elements belonging to Period 6 may include W.

The B is preferably at least one of Ti, V, Cr, Mn, Fe, Co, Ni, Zr, Nb, Mo, Ru, and W. Among the above, the B preferably includes at least one of the transition metal elements belonging to Period 4 that are Ti, V, Cr, Mn, Fe, Co, and Ni, and more preferably includes at least one of Mn, Co, Ni, and Fe.

As shown in the later described Examples, the active material including Mn, Co, Ni, or Fe at the B site may exhibit a high charge and discharge capacity. Also, the above described transition metal elements belonging to Period 4 generally have small atomic number so that a high capacity may be obtained and a favorable redox property may be exhibited. Since the transition metal elements belonging to the same Period usually have similar property, the active material is presumed to exhibit a high charge and discharge capacity by also including the exemplified transition metal elements belonging to Period 4 that are not the above described four kinds, at the B site in the perovskite structure.

Also, the above described transition metal elements belonging to Period 5 and Period 6 are generally known as to correspond to the B site in the perovskite structure, and considered to have similar property to that of the above exemplified transition metal elements belonging to Period 4. Therefore, the active material is presumed to exhibit a high charge and discharge capacity by also including the above described transition metal elements belonging to Period 5 and Period 6 at the B site in the perovskite structure.

Among the transition metal elements belonging to Period 4 to Period 6, the B particularly preferably includes Co. The reason therefor is to increase the potential and power of the active material by including Co at the B site in the perovskite structure. Also, a discharge plateau in the fluoride ion battery using the active material of the present disclosure may appear at higher potential, and the energy density may be increased. Specifically, as shown by the results for the later described Examples 4 and 7, in the fluoride ion battery using the active material including Co at the B of $ABO_3$, a discharge plateau may appear in the vicinity of 2 V (vs. $Pb/PbF_2$).

Here, for the oxide active materials used for a Li ion battery, it is generally known that, when the transition metal element at the B site is Fe, Mn, Co, and Ni, the potential increases in this order. It is presumed that this is because, in the Li ion battery, the valence change of the transition metal element included in the active material contributes to charge and discharge.

On the contrary, as shown in the later described Examples, in the fluoride ion battery, a potential increasing tendency was not confirmed even though the valence of the transition metal element positioned at the B site in the perovskite structure changed, and the highest potential was confirmed when the active material including Co at the B site was used. This is presumed to be a phenomenon peculiar to a fluoride ion battery, different from that of a Li ion battery.

The B may be only Co, and may be Co and the transition metal element other than Co. When the B is Co and the transition metal element other than Co, the crystal phase in the present disclosure may be represented by $ACo_{1-Z}B'_ZO_3$. The B' is a transition metal element other than Co. In this case, Z is preferably 0 or more, may be 0.1 or more, and may be 0.2 or more. Also, Z is preferably 0.5 or less, may be 0.4 or less, and may be 0.2 or less.

The B' may be at least one kind of the transition metal element that is not Co, and that belongs to Period 4 to Period 6 in the periodic table, the B' may be one kind, and may be two kinds or more.

In the crystal phase in the present disclosure, the A preferably includes Ca as the main component, and the B preferably includes Mn as the main component. As shown in the later described FIG. 16, since the battery using $CaMnO_3$ as the active material may have a high capacity maintenance rate by repeating the cycle of charge and discharge, and also the high capacity maintenance rate may be maintained, a high cycle property may be exhibited. Here, in the A including Ca as the main component, the proportion of Ca in the A may be 50 mol % or more, may be 70 mol % or more, and may be 90 mol % or more. When the B includes Mn as the main component, the proportion of Mn in the B is likewise to the above.

The phase crystal of the present disclosure in which the A includes Ca as the main component and the B includes Mn as the main component, preferably has a representative peak at a position of $2\theta = 23.8°\pm0.5°$, $34.0°\pm0.5°$, $48.8°\pm0.5°$, $60.8°\pm0.5°$, $71.5°\pm0.5°$, and $81.6°\pm0.5°$ in a powder X-ray diffraction (XRD) measurement using a CuKα ray. These peak positions are based on the XRD measurement result for the later described $CaMnO_3$, and similar crystal phase to that of $CaMnO_3$ may be determined by setting the range of $\pm0.5°$; as the result, a high cycle property as with $CaMnO_3$ may be presumably exhibited. Incidentally, the range of the peak position may be $\pm0.3°$, and may be $\pm0.1°$ according to the measurement accuracy. Incidentally, these peak values may be obtained by the measurement within a range of $2\theta=10°$ to $100°$, at the scanning rate of 5°/min, using a CuKα ray.

Also, when the crystal phase having the perovskite structure in the present disclosure is represented by a fluoride of the $ABO_3$, the fluoride of the $ABO_3$ may be a fluoride $ABO_{3-X}F_Y$ (X=0, Y is a number more than 0) obtained by the fluorination of the A or the B in $ABO_3$, and may be a fluoride $ABO_{3-X}F_Y$ (each of X and Y is a number more than 0) obtained by the substitution of a part of O in the $ABO_3$ with a fluoride ion; however, the latter is preferable in the present disclosure.

In the $ABO_{3-X}F_Y$ crystal phase (each of X and Y is a number), the X is usually 0 or more, may be more than 0, may be 0.5 or more, and may be 1.0 or more. Also, the X may be less than 3, may be 1.5 or less, and may be 1.0 or less.

Meanwhile, the value of the Y may be the same value as the X (X=Y), and may be different from the X. The Y is usually 0 or more, may be more than 0, may be 0.2 or more, and may be 0.5 or more. Also, the Y may be 2 or less, may be 1.0 or less, and may be 0.5 or less.

Incidentally, when both of the X and the Y in $ABO_{3-x}F_y$ are 0, in other words, when the crystal phase is $ABO_3$, the active material of the present disclosure is in the state before the initial charge, or in the completely discharged state. Meanwhile, when each of the X and the Y in $ABO_{3-x}F_y$ is a desired value more than 0, or when the X is 0 and the Y is a desired value more than 0, the active material of the present disclosure is in the charged state.

The active material of the present disclosure preferably contains the crystal phase represented by $ABO_3$ or a fluoride of the $ABO_3$ as the main component. Specifically, the proportion of the crystal phase with respect to the whole crystal phases included in the active material is preferably 50 mol % or more, more preferably 70 mol % or more, and further preferably 90 mol % or more.

The shape of the active material in the present disclosure is not particularly limited, and an example thereof may include a granular shape. The average particle diameter ($D_{50}$) of the active material is, for example, in a range of 0.1 μm to 50 μm, and preferably in a range of 1 μm to 20 μm. The average particle diameter ($D_{50}$) of the active material may be measured from the result of a particle distribution measurement by a laser diffraction scattering method, for example.

A producing method for the active material of the present disclosure is not particularly limited if the method allows the objected active material to be obtained, and example thereof may include a solid phase reaction method. In the solid phase reaction method, a metallic salt containing a metal element to be an A ion (A ion source) and a metallic salt containing a metal element to be a B ion (B ion source), to be included in $ABO_3$ crystal phase, are mixed and subjected to a heat treatment so as to cause a solid phase reaction and thereby synthesize an active material. Further, the obtained active material may be subjected to a fluorination treatment.

B. Fluoride Ion Battery

Figure 2:
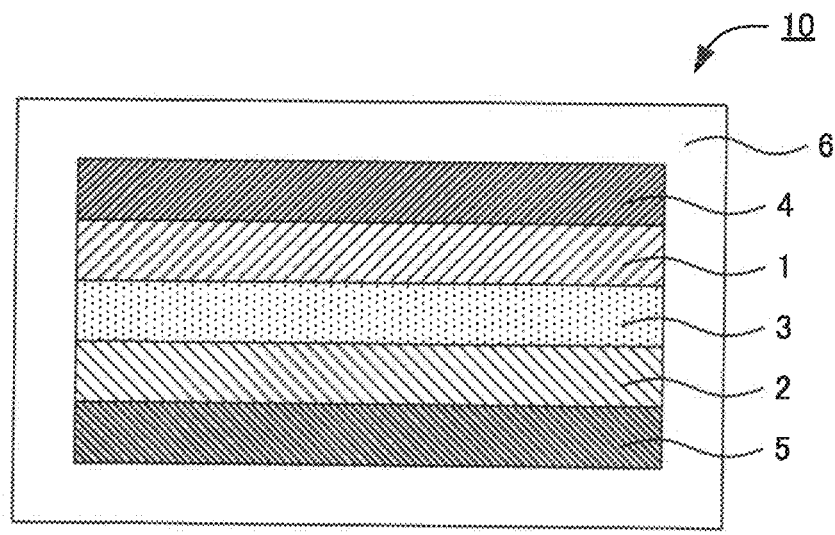
FIG. 2 is a schematic cross-sectional view showing an example of the fluoride ion battery of the present disclosure.

FIG. 2 is a schematic cross-sectional view showing an example of the fluoride ion battery of the present disclosure. Fluoride ion battery 10 shown in FIG. 2 comprises cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present disclosure features the configuration in which the above described active material is used as the cathode active material or the anode active material.

According to the present disclosure, usage of the above described active material allows a fluoride ion battery with a favorable cycle property.

The fluoride ion battery of the present disclosure will be hereinafter described in each constitution.

1. Cathode Active Material Layer

The cathode active material layer in the present disclosure is a layer containing at least a cathode active material. Also, the cathode active material layer may further contain at least one of a conductive material and a binder, other than the cathode active material.

In the present disclosure, the above described active material may be used as the cathode active material. Meanwhile, an arbitrary active material having higher potential may be used for the cathode active material when the above described active material is used as the anode active material.

The conductive material is not particularly limited if it has the desired electron conductivity, and examples thereof may include carbon materials. Examples of the carbon material may include carbon blacks such as acetylene black, Ketjen black, furnace black, and thermal black; graphene, fullerene, and carbon nanotube. Meanwhile, the binder is not particularly limited if it is chemically and electronically stable, and examples thereof may include fluorine based binders such as polyvinylidene fluoride (PVDF) and polytetrafluoroethylene (PTFE).

Also, the content of the cathode active material in the cathode active material layer is preferably larger from the viewpoint of the capacity; the content is, for example, 30% by weight or more, preferably 50% by weight or more, and more preferably 70% by weight or more. Also, the thickness of the cathode active material layer varies greatly with the constitution of the battery, and thus is not particularly limited.

2. Anode Active Material Layer

The anode active material layer in the present disclosure is a layer containing at least an anode active material. Also, the anode active material layer may further contain at least one of a conductive material and a binder, other than the anode active material.

In the present disclosure, the above described active material may be used as the anode active material. Meanwhile, an arbitrary active material having lower potential may be used for the anode active material when the above described active material is used as the cathode active material.

In terms of the conductive material and the binder, the same materials described in the above "1. Cathode active material layer" may be used. Also, the content of the anode active material in the anode active material layer is preferably larger from the viewpoint of the capacity; the content is, for example, 30% by weight or more, preferably 50% by weight or more, and more preferably 70% by weight or more. Also, the thickness of the anode active material layer varies greatly with the constitution of the battery, and thus is not particularly limited.

3. Electrolyte Layer

The electrolyte layer in the present disclosure is a layer formed between the cathode active material layer and the anode active material layer. The electrolyte included in the electrolyte layer may be an electrolyte solution (liquid electrolyte), and may be a solid electrolyte.

The liquid electrolyte in the present disclosure contains, for example, a fluoride salt and an organic solvent. Examples of the fluoride salt may include an inorganic fluoride salt, an organic fluoride salt, and an ionic liquid. An example of the inorganic fluoride salt may be XF (X is Li, Na, K, Rb or Cs). An example of the cation of the organic fluoride salt may be an alkyl ammonium cation such as a tetramethyl ammonium cation. The concentration of the fluoride salt in the liquid electrolyte is, for example, in a range of 0.1 mol % to 40 mol %, and preferably in a range of 1 mol % to 10 mol %.

The organic solvent for the liquid electrolyte is usually a solvent that dissolves the fluoride salt. Examples of the organic solvent may include glyme such as triethylene glycol dimethyl ether (G3) and tetraethylene glycol dimethyl ether (G4); cyclic carbonates such as ethylene carbonate (EC), fluoro ethylene carbonate (FEC), difluoro ethylene carbonate (DFEC), propylene carbonate (PC), and butylene carbonate (BC); and chain carbonates such as dimethyl carbonate (DMC), diethyl carbonate (DEC), and ethyl methyl carbonate (EMC). Also, an ionic liquid may be used as the organic solvent.

On the other hand, examples of the solid electrolyte may include a fluoride of a lanthanoid element such as La and Ce; a fluoride of an alkaline element such as Li, Na, K, Rb, and Cs; and a fluoride of an alkaline earth element such as Ca, Sr, and Ba. Specific examples may include a fluoride of La and Ba (such as $La_{0.9}Ba_{0.1}F_{2.9}$) and a fluoride of Pb and Sn.

Also, the thickness of the electrolyte layer in the present disclosure varies greatly with the constitution of the battery, and thus is not particularly limited.

4. Other Constitutions

The fluoride ion battery of the present disclosure comprises at least the above described anode active material layer, cathode active material layer, and electrolyte layer; further, usually comprises a cathode current collector for collecting currents of the cathode active material layer, and an anode current collector for collecting currents of the anode active material layer. Examples of the shape of the current collectors may include a foil shape, a mesh shape, and a porous shape. Also, the fluoride ion battery of the present disclosure may comprise a separator between the cathode active material layer and the anode active material layer. The reason therefor is to obtain a battery with higher safety.

5. Fluoride Ion Battery

The fluoride ion battery of the present disclosure may be a primary battery or may be a secondary battery, but is preferably a secondary battery among them. The reason therefor is to be repeatedly charged and discharged and useful as, for example, a car-mounted battery.

Incidentally, the primary battery includes a usage of a secondary battery as a primary battery (the use for the purpose of just one time discharge after charge). Also, examples of the shape of the fluoride ion battery of the present disclosure may include a coin shape, a laminate shape, a cylindrical shape, and a square shape. Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be hereinafter described in more details with reference to Examples.

Example 1

Synthesis of Active Material $CaCO_3$ and $MnO_2$ were weighed so as to be 1:1 in the molar ratio, and these were mixed by ball milling. The obtained powder was subjected to pellet molding, and heat treated at 800° C. for 10 hours to obtain an active material ($CaMnO_3$).

Production of Battery

A fluoride ion battery was prepared using the obtained active material as the cathode active material. The cathode active material, the fluoride ion conductive material $La_{0.9}Ba_{0.1}F_{2.9}$, and the conductive material VGCF were mixed at the proportion of 30:60:10 (in the ratio of % by mass), and were subjected to pellet molding to obtain an electrode pellet (10 mg).

Figure 3:
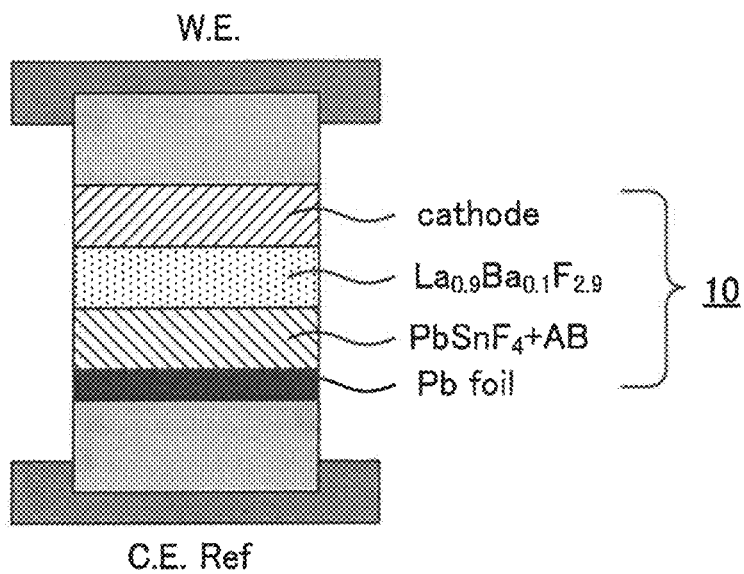
FIG. 3 is a schematic cross-sectional view showing the constitution of the evaluation cell using the fluoride ion batteries prepared in Examples 1 to 8.

By using the obtained electrode pellet as a working electrode (cathode), an all solid fluoride ion battery (hereinafter may simply be referred to as battery) comprising the solid electrolyte layer using $La_{0.9}Ba_{0.1}F_{2.9}$ (100 mg), the layer in which $PbSnF_4$ and acetylene black (AB) were mixed, and the counter electrode (anode) using a Pb foil, was produced by pressure powder molding (FIG. 3).

Example 2

$SrCO_3$ and $MnO_2$ were weighed so as to be 1:1 in the molar ratio, and these were mixed by ball milling. The obtained powder was subjected to pellet molding, and heat treated at 1200° C. for 10 hours to obtain an active material ($SrMnO_3$). Further, a battery was obtained in the same manner as in Example 1 except that the obtained active material was used as the cathode active material.

Example 3

$SrCO_3$ and $Fe_2O_3$ were weighed so as to be 2:1 in the molar ratio, and these were mixed by ball milling. The obtained powder was subjected to pellet molding, and heat treated at 1200° C. for 10 hours to obtain an active material ($SrFeO_3$). Further, a battery was obtained in the same manner as in Example 1 except that the obtained active material was used as the cathode active material.

Example 4

$SrCO_3$ and $Co_3O_4$ were weighed so as to be 3:1 in the molar ratio, and these were mixed by ball milling. The obtained powder was subjected to pellet molding, and heat treated at 1200° C. for 10 hours to obtain an active material ($SrCoO_3$). Further, a battery was obtained in the same manner as in Example 1 except that the obtained active material was used as the cathode active material.

Example 5

$La_2O_3$ and $MnO_2$ were weighed so as to be 1:2 in the molar ratio, and these were mixed by ball milling. The obtained powder was subjected to pellet molding, and heat treated at 1200° C. for 10 hours to obtain an active material ($LaMnO_3$). Further, a battery was obtained in the same manner as in Example 1 except that the obtained active material was used as the cathode active material.

Example 6

$La_2O_3$ and $Fe_2O_3$ were weighed so as to be 1:1 in the molar ratio, and these were mixed by ball milling. The obtained powder was subjected to pellet molding, and heat treated at 1200° C. for 10 hours to obtain an active material ($LaFeO_3$). Further, a battery was obtained in the same manner as in Example 1 except that the obtained active material was used as the cathode active material.

Example 7

$La_2O_3$ and $Co_3O_4$ were weighed so as to be 3:2 in the molar ratio, and these were mixed by ball milling. The obtained powder was subjected to pellet molding, and heat treated at 1200° C. for 10 hours to obtain an active material (LaCoO$_3$). Further, a battery was obtained in the same manner as in Example 1 except that the obtained active material was used as the cathode active material.

Example 8

La$_2$O$_3$ and NiO were weighed so as to be 1:2 in the molar ratio, and these were mixed by ball milling. The obtained powder was subjected to pellet molding, and heat treated at 1200° C. for 10 hours to obtain an active material (LaNiO$_3$). Further, a battery was obtained in the same manner as in Example 1 except that the obtained active material was used as the cathode active material.

[Evaluation]

Powder XRD Measurement

Figure 4:
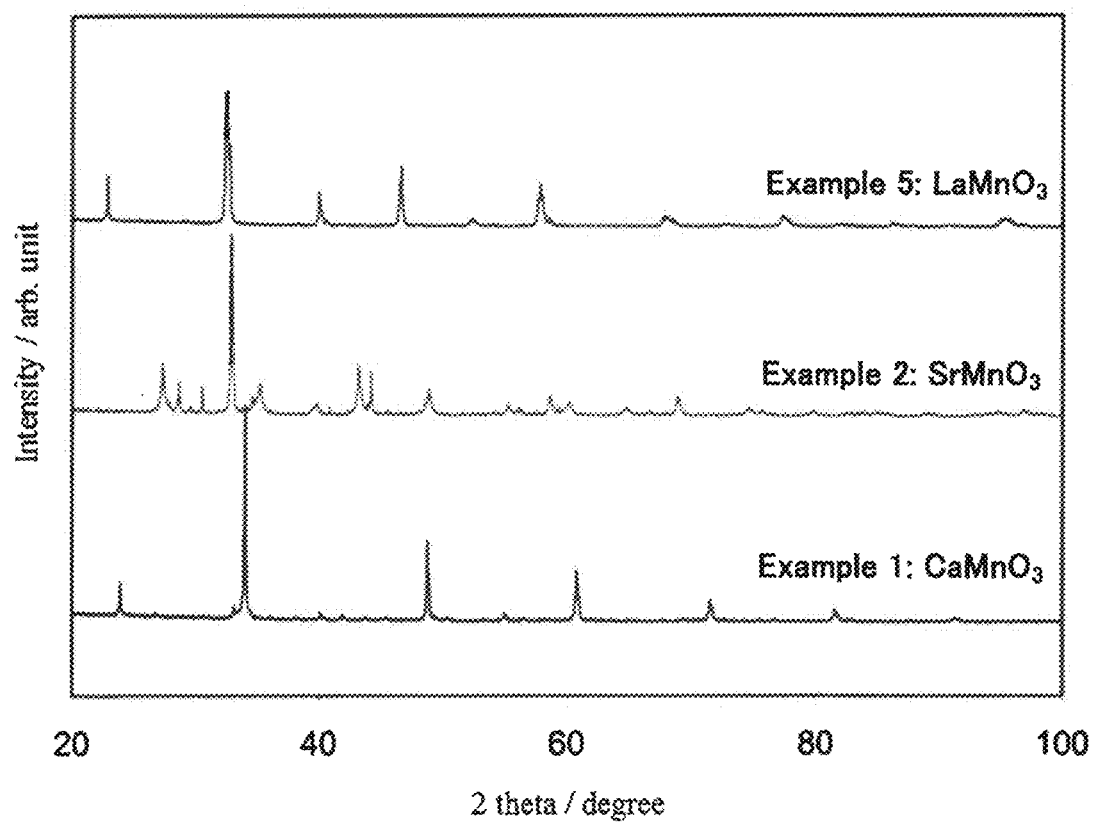
FIG. 4 is the result of an XRD measurement for the active materials obtained in Examples 1, 2, and 5.
Figure 5:
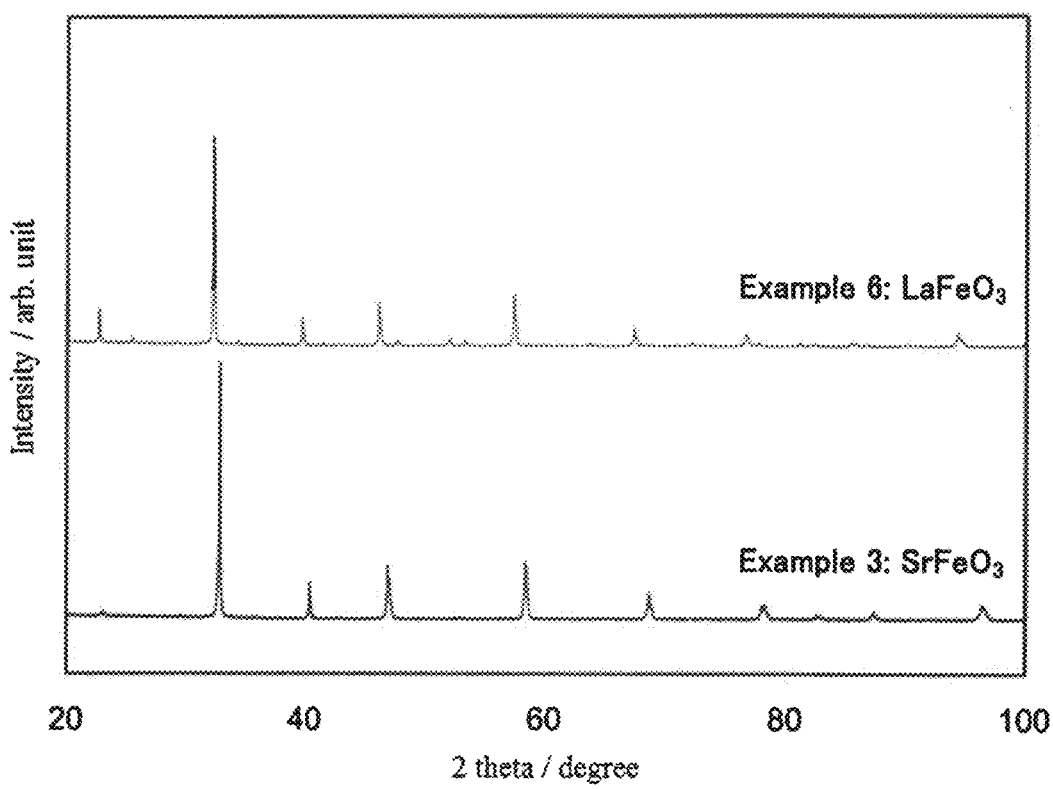
FIG. 5 is the result of an XRD measurement for the active materials obtained in Examples 3 and 6.
Figure 6:
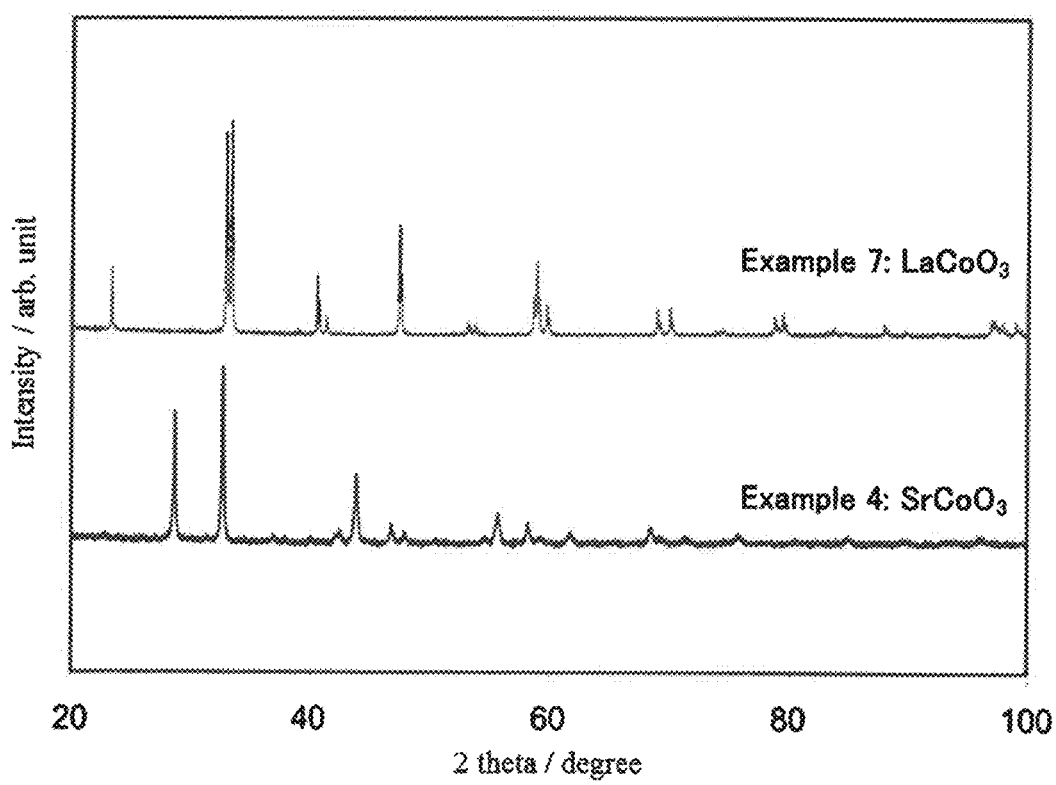
FIG. 6 is the result of an XRD measurement for the active materials obtained in Examples 4 and 7.
Figure 7:
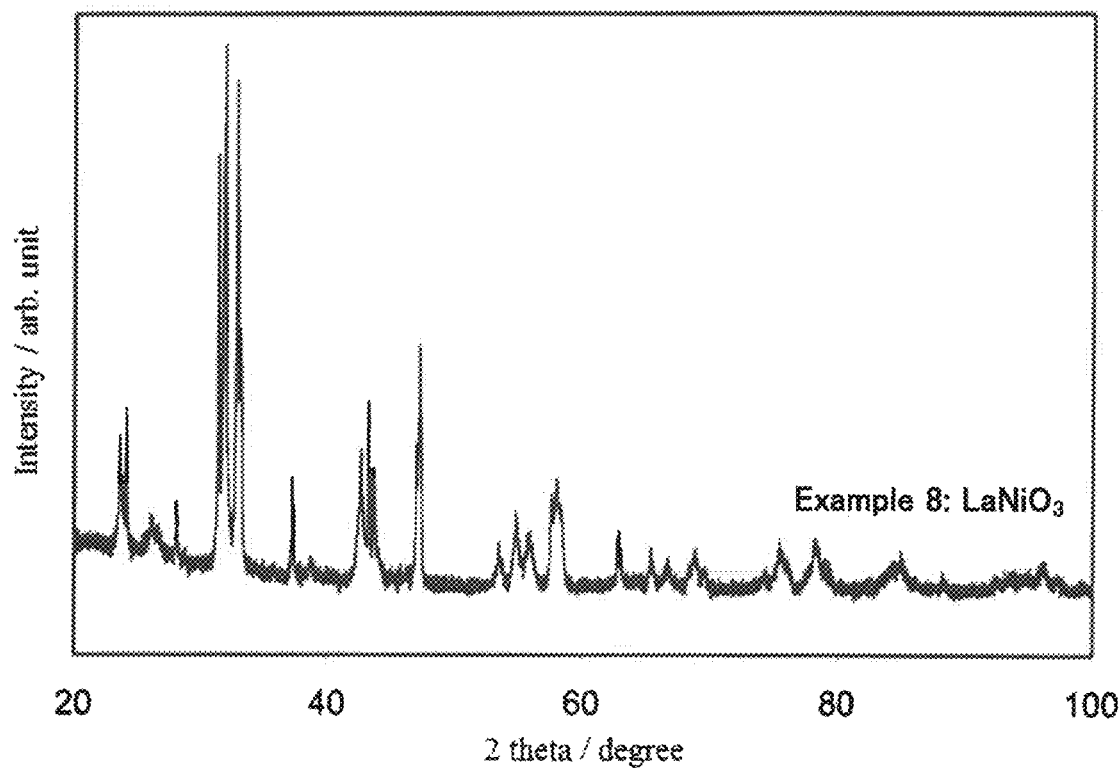
FIG. 7 is the result of an XRD measurement for the active material obtained in Example 8.
Figure 8:
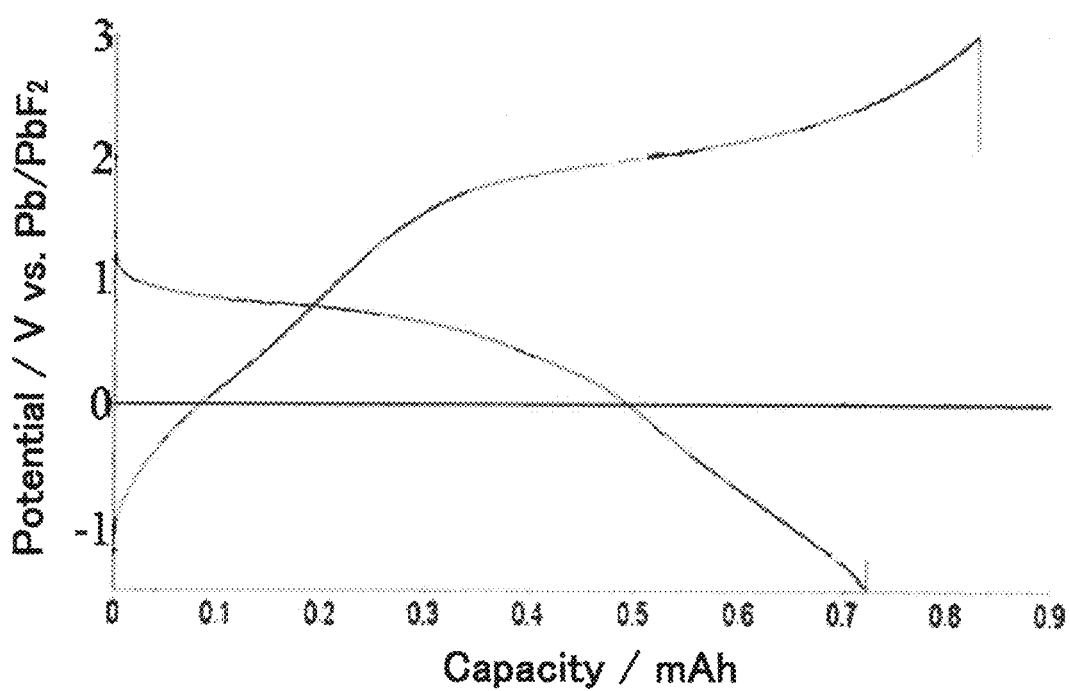
FIG. 8 is the result of a charge and discharge test for the battery obtained in Example 1.
Figure 9:
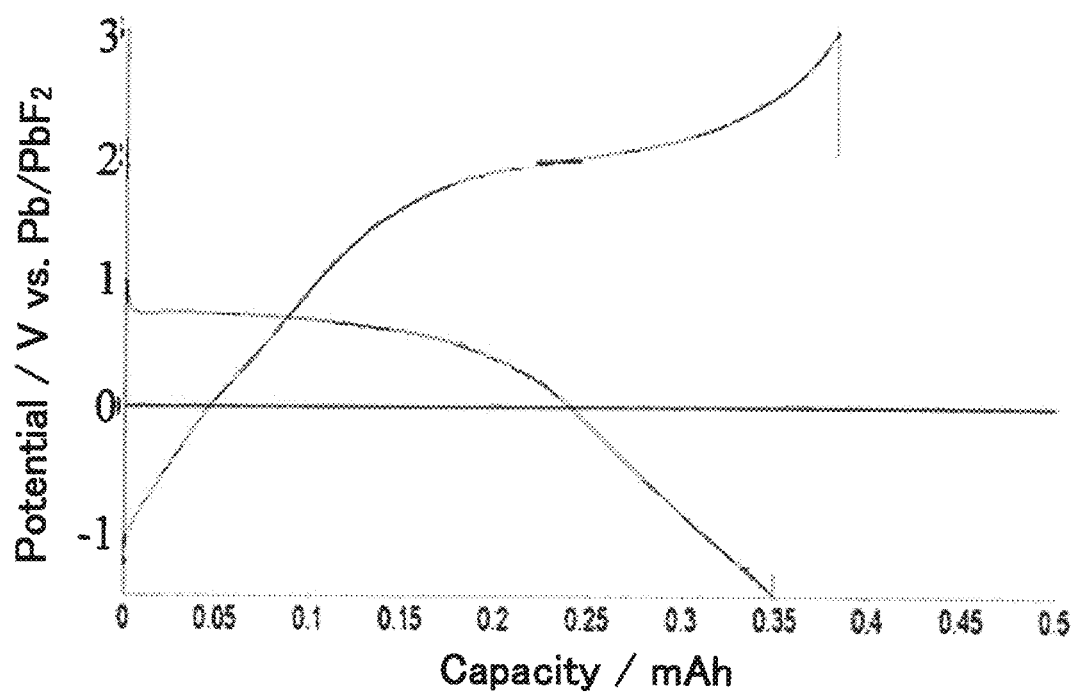
FIG. 9 is the result of a charge and discharge test for the battery obtained in Example 2.
Figure 10:
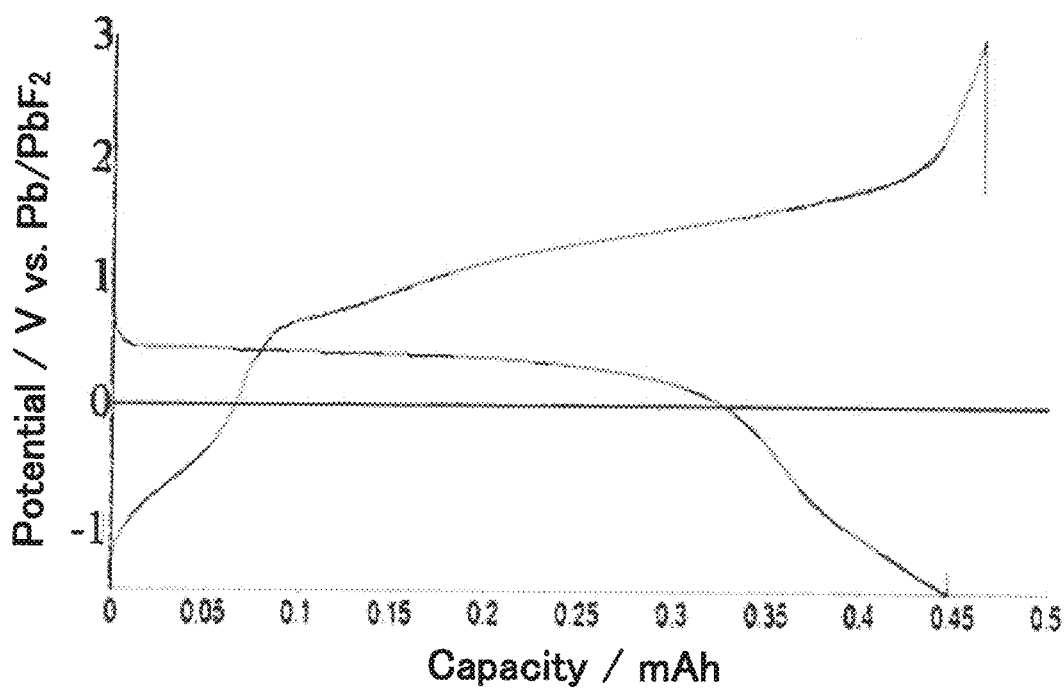
FIG. 10 is the result of a charge and discharge test for the battery obtained in Example 3.

A powder XRD measurement was conducted for each active material obtained in Examples 1 to 8. Each measurement was conducted by using a CuKα ray, within a range of 2θ=10° to 100°, at the scanning rate of 5°/min. The results thereof are shown in FIG. 4 (Examples 1, 2, and 5), FIG. 5 (Examples 3 and 6), FIG. 6 (Examples 4 and 7), and FIG. 7 (Example 8) respectively. As shown in FIGS. 4 to 7, it was confirmed that in each active material obtained in Examples 1 to 8, a crystal phase having the perovskite structure was formed as the main product.

Incidentally, as shown in FIG. 4, for the active material (CaMnO$_3$) obtained in Example 1, representative peaks were observed at positions of 2θ=23.8°, 34.0°, 48.8°, 60.8°, 71.5°, and 81.6°.

Charge and Discharge Test

A charge and discharge test was conducted in a cell heated to 140° C., for each battery obtained in Examples 1 to 8 (FIG. 3). The condition for the charge and discharge test was: a constant current charge and discharge from −1.5 V to 3.0 V (vs. Pb/PbF$_2$) at 0.03 mA. The results thereof are shown in FIGS. 8 to 15 (Examples 1 to 8).

As shown in FIGS. 8 to 15, each battery obtained in Examples 1 to 8 exhibited charge and discharge capacity relatively high in coulombic efficiency, within a range of −1.5 V to 2.0 V (vs. Pb/PbF$_2$). From these results, it was confirmed that each active material obtained in Examples 1 to 8 fulfilled functions as an active material that is able to be charged and discharged reversibly, and has a favorable capacity property by comprising the crystal phase having the perovskite structure and the specific composition.

Figure 11:
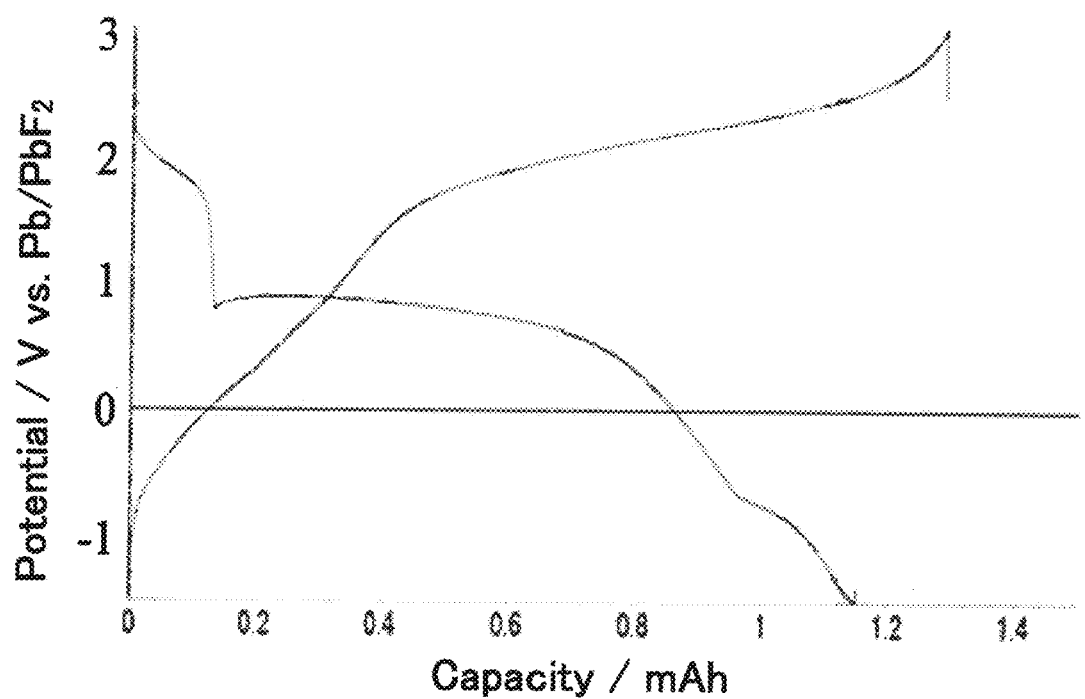
FIG. 11 is the result of a charge and discharge test for the battery obtained in Example 4.
Figure 12:
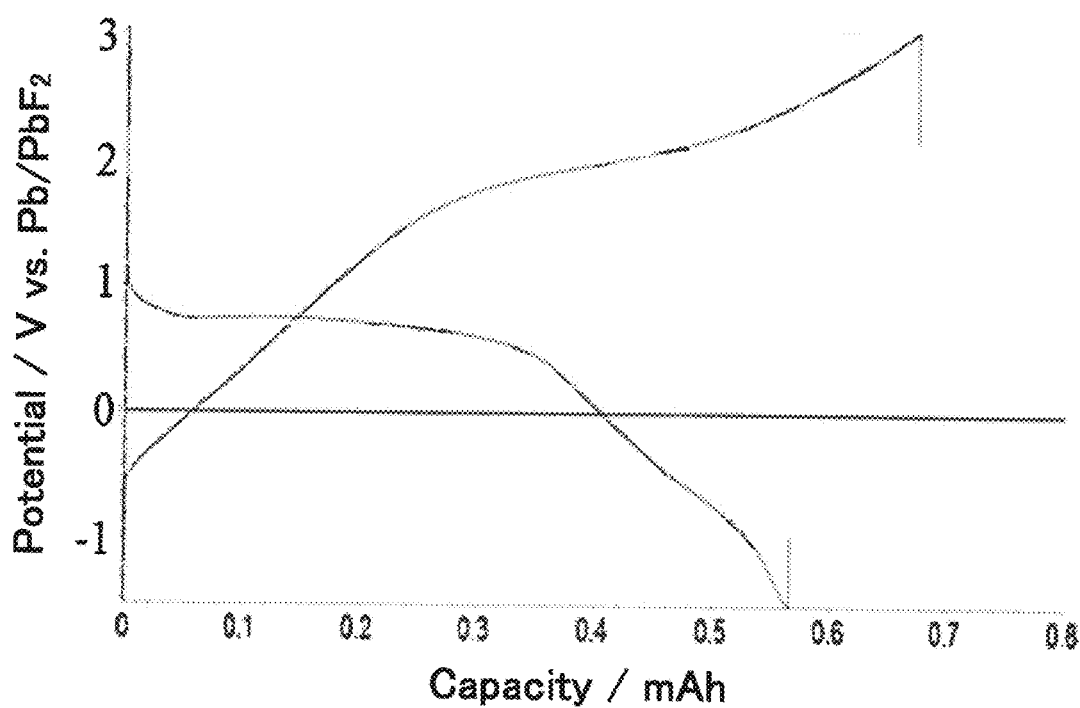
FIG. 12 is the result of a charge and discharge test for the battery obtained in Example 5.
Figure 13:
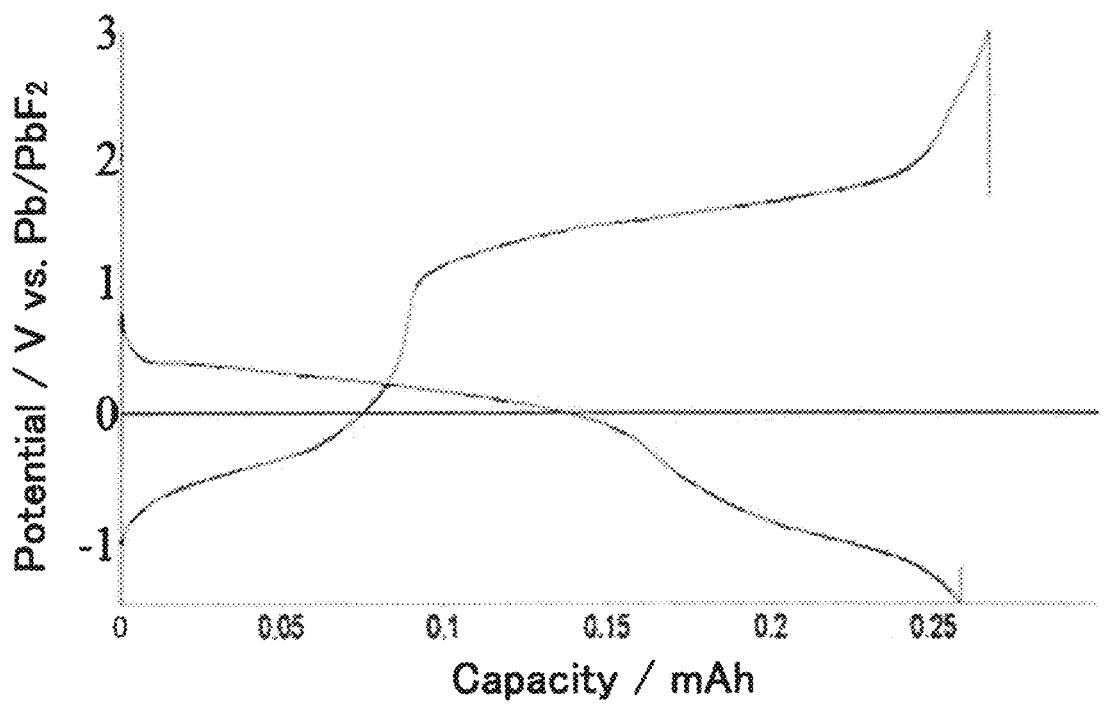
FIG. 13 is the result of a charge and discharge test for the battery obtained in Example 6.
Figure 14:
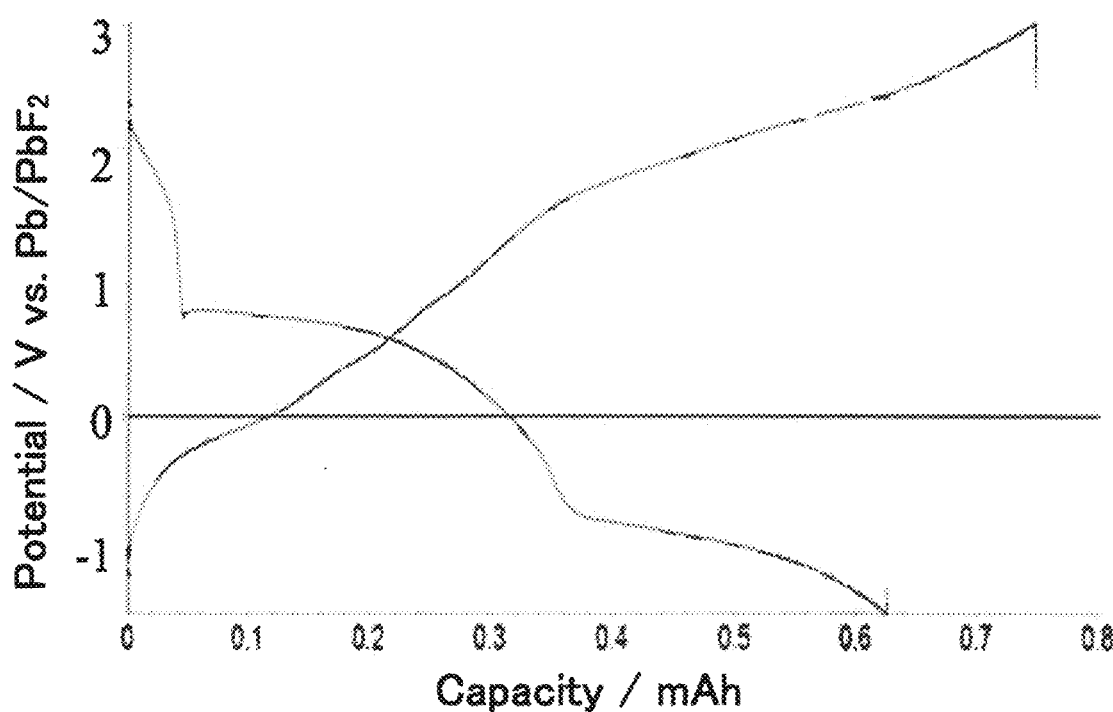
FIG. 14 is the result of a charge and discharge test for the battery obtained in Example 7.
Figure 15:
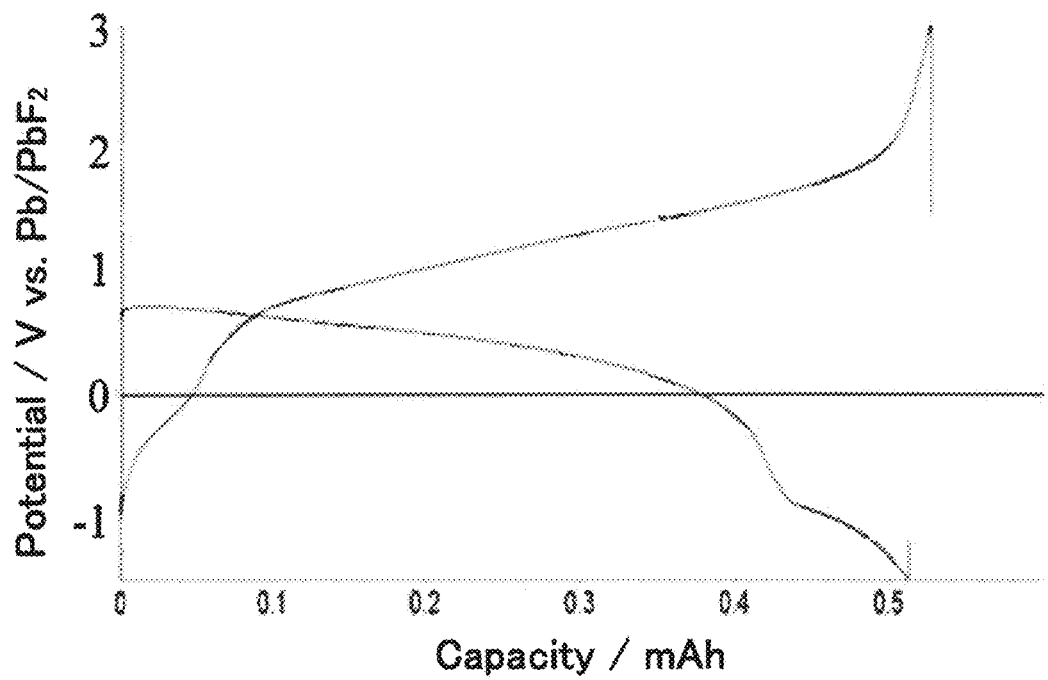
FIG. 15 is the result of a charge and discharge test for the battery obtained in Example 8.

Also, in FIG. 11 (Example 4) and FIG. 14 (Example 7), a discharge plateau was confirmed respectively in the vicinity of 2 V (vs. Pb/PbF$_2$). From these results, it was suggested that the active material including Co at the B site (the B of ABO$_3$) in the perovskite structure had higher potential than that of the active material including other transition metal than Co at the B site. Thereby, it was suggested that the active material of the present disclosure was capable of achieving higher potential according to the kinds of the transition metal element positioned at the B site in the perovskite structure.

Cycle Property

The capacity maintenance rate, in each cycle, of the battery (active material: CaMnO$_3$) obtained in Example 1 was determined by conducting 10 cycles of charge and discharge under the same conditions as that of the above described charge and discharge test. The capacity maintenance rate was calculated as a capacity proportion after each cycle when the initial capacity is 100%. The results are shown in FIG. 16.

Figure 16:
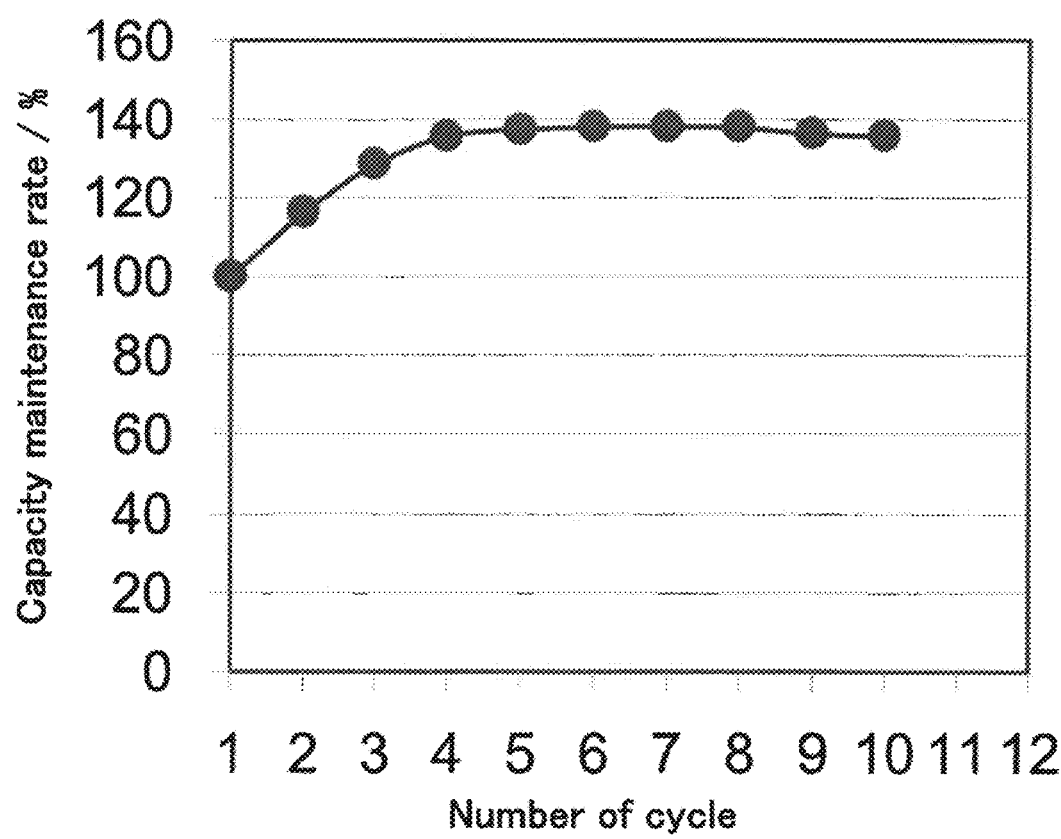
FIG. 16 is the result of a cycle property evaluation for the battery obtained in Example 1.

As shown in FIG. 16, in the battery obtained in Example 1, the capacity maintenance rate increased from the first to the fifth cycle, and high capacity maintenance rate was maintained from the sixth cycle and after.

REFERENCE SIGNS LIST 1 cathode active material layer
2 anode active material layer
3 electrolyte layer
4 cathode current collector
5 anode current collector
6 battery case
10 fluoride ion battery
11 A ion
12 B ion
13 oxygen ion

What is claimed is:

1. A fluoride ion battery comprising a cathode active material layer containing a cathode active material, an anode active material layer containing an anode active material, and an electrolyte layer formed between the cathode active material layer and the anode active material layer,
   wherein the cathode active material or the anode active material is an active material comprising:
      a crystal phase having a perovskite structure, and the crystal phase having a composition of ABO$_3$ or ABO$_{3-x}$F$_y$ where X=0 and Y is a number more than 0, in which the A and the B are different metal elements; the A includes at least one kind of a metal element belonging to Group 2 and Group 3 in the periodic table; and the B includes at least one kind of a transition metal element belonging to Period 4 to Period 6 in the periodic table.

2. The fluoride ion battery according to claim 1, wherein the A includes at least one of Mg, Ca, Sr, Ba, Sc, Y, La, Ce, Nd, and Sm.

3. The fluoride ion battery according to claim 1, wherein the B includes at least one of Ti, V, Cr, Mn, Fe, Co, Ni, Zr, Nb, Mo, Ru, and W.

4. The fluoride ion battery according to claim 3, wherein the B includes Co.

5. The fluoride ion battery according to claim 1, wherein the crystal phase has a composition of ABO$_3$.

6. The fluoride ion battery according to claim 1, wherein the crystal phase has a composition of ABO$_{3-x}$F$_y$ where X=0 and Y is a number more than 0.

7. The fluoride ion battery according to claim 1, wherein A includes at least one of Mg, Ca, Sr, Sc, Y, La, Ce, Nd and Sm.

8. The fluoride ion battery according to claim 1, wherein A includes at least one of Ca, Sr and La.

9. The fluoride ion battery according to claim 8, wherein B includes at least one of Mn, Fe, Co and Ni.

10. The fluoride ion battery according to claim 1, wherein A includes Ca, and B includes Mn.

11. The fluoride ion battery according to claim 1, wherein A includes Sr, and B includes Mn.

12. The fluoride ion battery according to claim 1, wherein A includes Sr, and B includes Fe.

13. The fluoride ion battery according to claim 1, wherein A includes Sr, and B includes Co.

14. The fluoride ion battery according to claim 1, wherein A includes La, and B includes Mn.

15. The fluoride ion battery according to claim 1, wherein A includes La, and B includes Fe.

16. The fluoride ion battery according to claim 1, wherein A includes La, and B includes Co.

17. The fluoride ion battery according to claim 1, wherein A includes La, and B includes Ni.

18. The fluoride ion battery according to claim 1, wherein a proportion of the crystal phase having the perovskite structure and the composition of $ABO_3$ or $ABO_{3-x}F_y$, where X=0 and Y is a number more than 0 with respect to all crystal phases included in the active material is 50 mol % or more.

* * * * *